United States Patent
Takano

[11] 3,918,797
[45] Nov. 11, 1975

[54] ZOOM LENS HAVING A SHIFTABLE DIAPHRAGM DISPOSED BETWEEN TWO ZOOM COMPONENTS

[75] Inventor: Eiichi Takano, Tokyo, Japan

[73] Assignee: Canon Kabushiki Kaisha, Japan

[22] Filed: Feb. 20, 1974

[21] Appl. No.: 444,178

[30] Foreign Application Priority Data
Feb. 24, 1973 Japan.............................. 48-21766

[52] U.S. Cl. ................. 350/186; 350/207; 354/196
[51] Int. Cl.² ........................................ G02B 15/16
[58] Field of Search .................. 350/184, 186, 187; 354/196

[56] References Cited
UNITED STATES PATENTS

| | | | |
|---|---|---|---|
| 2,663,223 | 12/1953 | Hopkins | 350/184 |
| 2,741,155 | 4/1956 | Hopkins | 350/184 |
| 3,433,559 | 3/1969 | Vockenhuber et al. | 350/184 X |

*Primary Examiner*—John K. Corbin
*Attorney, Agent, or Firm*—McGlew and Tuttle

[57] ABSTRACT

A zoom lens, having a diaphragm and comprising four coaxial lens components spaced axially from one another, includes a first component movable for focussing and a second component movable for zooming in front of the diaphragm, and includes a third component movable with the second component and a fourth stationary component behind the diaphragm. When zooming is performed, the diaphragm is shifted while the position of the exit pupil of the diaphragm produced by the third component is maintained fixed with respect to the fourth component. The aperture of the shifted diaphragm is simultaneously adjusted so as to maintain constant the diameter of the exit pupil during the zooming, thereby compensating the variation of F-number caused by the shifting. With this arrangement, it is possible to relatively decrease the diameter of the front lens member with a decrease in aberrations, because the diaphragm may be placed at a short distance, heretofore unattainable, from the center of the complete objective. The axial pencil that can pass through the fixed exit pupil is maintained unchanged in the fourth component with respect to the angular extent during the zooming so that aberrations of higher order can be stabilized by a suitable design of the fourth component throughout the entire zooming range. The zoom objective is usable with a color television camera by disposing its beam splitting system behind the fourth component, because the variation of color shading is not effected by the zooming.

3 Claims, 2 Drawing Figures

ZOOM LENS HAVING A SHIFTABLE DIAPHRAGM DISPOSED BETWEEN TWO ZOOM COMPONENTS

BACKGROUND OF THE INVENTION

This invention relates to zoom objectives, and more particularly it relates to a zoom objective having a shiftable diaphragm.

Zoom objectives may be classified into two large groups with regard to the function of a diaphragm. Most of the zoom objectives in one group may conveniently be considered as comprising zoom components, e.g., variator and compensator, movable for zooming, a diaphragm which remains stationary as far as zooming is concerned, and a relay system in this order from the front. Such a zoom objective will be hereinafter referred to as "stationary diaphragm zoom objective". The other group of zoom objectives employs a diaphragm arranged to be shiftable during the zooming in a space within the movable lens components, which zoom objective will be hereinafter referred to as "shiftable diaphragm zoom objective".

In the stationary diaphragm zoom objective, the diaphragm is located in a space in which an axial pencil of rays is maintained unchanged by the zooming, so that it is not necessary to control the aperture of the diaphragm in accordance with the movement of the variator and compensator. Also in the relay system, the axial pencil that can pass through the constant diaphragm aperture will not be changed by the zooming, so that the residual aberrations of higher order can be balanced in the relay system. The stationary diaphragm zoom objective is usable with a color television camera, as the beam splitting system including dichroic mirrors may be placed in the back focus. In this case, variation of color shading with zooming is not effected.

On the other hand, a drawback of the stationary diaphragm zoom objective is that the diaphragm has to be located at a considerably long distance rearwardly from the center of the complete objective. Such a location of the diaphragm requires the provision of increased diameters for the front lens member, or otherwise an efficient lens performance cannot be maintained throughout the entire zoom range particularly in the shortest focal length positions. Increasing the diameter of the front lens member increases the difficulty of correcting the aberrations. Therefore, a large field angle cannot be realized in the stationary diaphragm zoom objective particularly of large zoom ratio and high relative aperture.

The above-mentioned drawback is overcome in a shiftable diaphragm zoom objective disclosed in the Journal of the SMPTE published August 1960. As illustrated in Ibid pp. 538 FIG. 5, this objective has a diaphragm arranged to be shiftable at a comparatively short distance from the center of the complete objective and therefore has an advantage of decreasing the diameter of the front lens member. However, the objective is characterized by the lack of a lens group such that when zooming is performed, the axial pencil passing therethrough is maintained unchanged throughout the entire zoom range so as to balance the residual aberrations with the higher order aberrations which exist in the lens group. One of the reasons why the balancing is made impossible by the lack of the lens group, provided that the zoom ratio is restricted to lower level, is that the number of terms for the higher order aberrations of the axial pencil variable lens group exceeds the degree of freedom necessary for stabilization of aberrations with zooming. Further, shiftable diaphragm zoom objectives of which the exit pupils are shifted during the zooming cannot be used with color television cameras, because the color shading is varied to a large extent, so long as the beam splitting system is placed in the back focus.

SUMMARY OF THE INVENTION

The present invention is adapted to obviate the above-mentioned drawback and disadvantages in the case of a zoom lens having a shiftable diaphragm. Accordingly, it is an object of the present invention to provide a zoom lens having a diaphragm which is shifted when zooming is performed while nevertheless the state of correction of the image aberrations remains excellent throughout the entire zoom range.

Another object of the invention is to provide a zoom lens having a shiftable diaphragm usable with a stationary color television camera without causing the color shading to vary by the shifting of the diaphragm.

To achieve these objects, the present invention provides a zoom objective comprising a diaphragm and four coaxial components of lens elements arranged in such a manner that, with respect to incident light, the first component is axially movable for focussing, the second component is axially movable for zooming, the first and second components being in front of the diaphragm, the third component is movable with the second component, and the fourth component remains stationary during the zooming, the third and fourth components being behind the diaphragm, the diaphragm being shifted along the optical axis while the position of the diaphragm image produced by the third component is maintained fixed with respect to the fourth component during the zooming, and simultaneously the aperture of the shifted diaphragm is adjusted so as to maintain constant the diameter of the exit pupil of the diaphragm, whereby the compensation for the variation of F-number caused by the shifting of the diaphragm is effected simultaneously.

An advantage of the present invention, deriving from the arrangement that the diaphragm may be located closer to the center of the complete objective than was previously possible, is that the diameter of the front lens components may be decreased by a large amount relative to those for the remaining lens components from that of the zoom lens which might have otherwise constructed. The exit pupil is maintained fixed during the zooming so as to admit the axial pencil of the constant angular extent in the fourth component, thereby to give an added advantage that residual aberrations can be balanced out by a suitable design of the fourth lens component, or the relay lens component. An example of the design of the relay lens component is such that higher order aberrations of the relay component are adjusted so as to be balanced with lower order aberrations. In this case, the large variation of aberrations of higher order with zooming can be prevented, and, therefore, one needs only to balance the lower order aberrations throughout the entire zoom range. The lower order aberrations are few in number so that they are corrected comparatively easily. Further the pencil of rays in the back focus is not affected by the zooming so that a beam-splitting system of a color television camera may be disposed in the back focus.

DESCRIPTION OF THE PREFERRED EMBODIMENTS

Figure 1:
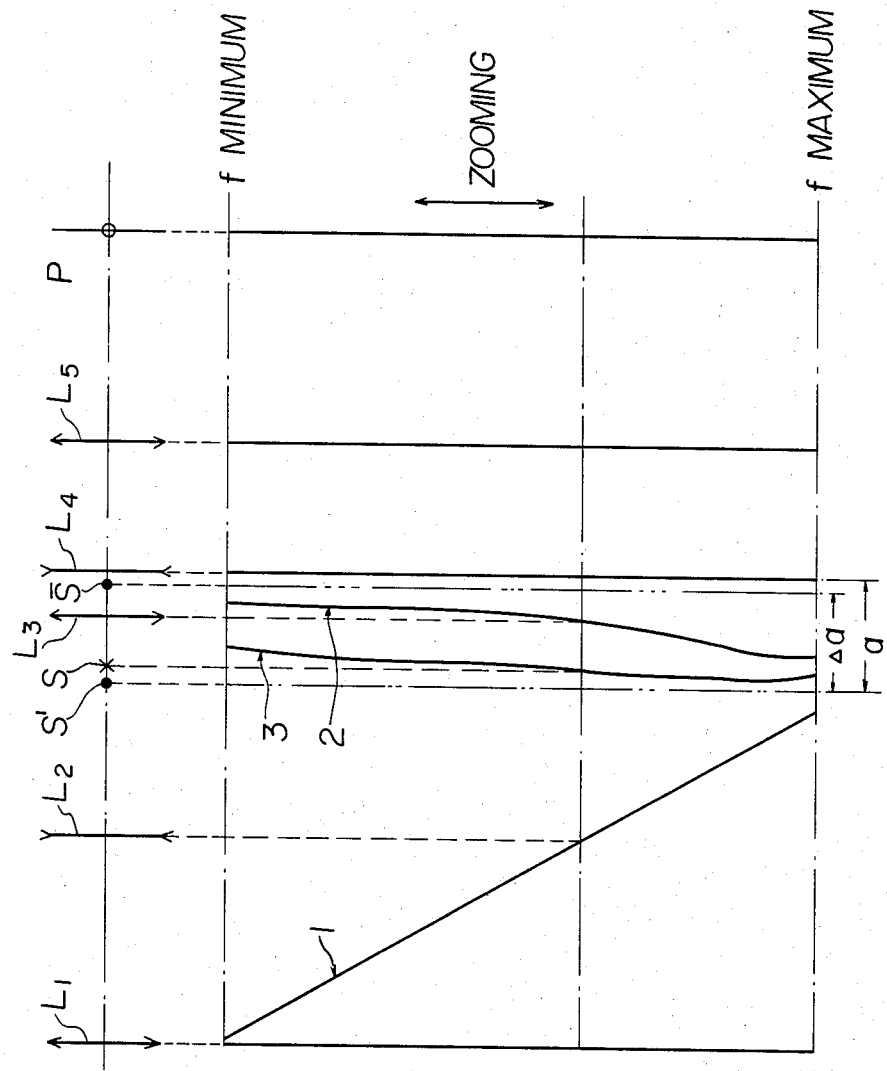
FIG. 1 diagrammatically and graphically illustrates the effect of the diaphragm shift on the position of the exit pupil in which the lens components are illustrated by thin lens representation, and the zoom components are moved in differential relationship to each other when zooming is performed in an embodiment of the zoom objective according to the invention.

Referring now to FIG. 1, a zoom objective of the invention is illustrated as comprising five thin lens components arranged in such a manner that, in respect to incident light, the first component $L_1$, movable for focussing but stationary during the zooming, has a positive power, the second component $L_2$ is a front zoom component of negative power which is movable along the optical axis in such a manner as indicated at line 1 when zooming from the longest to the shortest focal length range, the third component $L_3$ is a rear zoom component of positive power which is movable with the front zoom component $L_2$ in such a manner as indicated at curve 2, and the fourth and fifth components constituting a relay system which is stationary during the zooming have negative and positive powers respectively. The zoom objective is provided with a diaphragm S arranged in front of the rear zoom component $L_3$ to be shifted in such a manner as indicated by the curve 3 when zooming is performed, so that the position of the image S' of the diaphragm S produced by the rear component $L_3$ remains stationary with respect to the relay system throughout the entire zoom range, for example, at a distance, a, from the component $L_4$. In this case, the aperture of the shifted diaphragm is simultaneously adjusted so as to compensate the variation of the aperture ratio caused by the shifting. Symbol P indicates a focal plane, and symbol $\bar{S}$ indicates the position of a diaphragm in a prior art zoom objective. Conventionally the diaphragm is frequently placed behind the compensator and just in front of the relay system, so that the exit pupil of the diaphragm $\bar{S}$ may be considered to be produced by the component $L_3$, i.e., the compensator, at the same position as that of the diaphragm $\bar{S}$. In the zoom objective of the invention, however, the exit pupil S' is produced at a position forwardly spaced by a large distance, $\Delta a$, from the diaphragm position $\bar{S}$.

Figure 2:
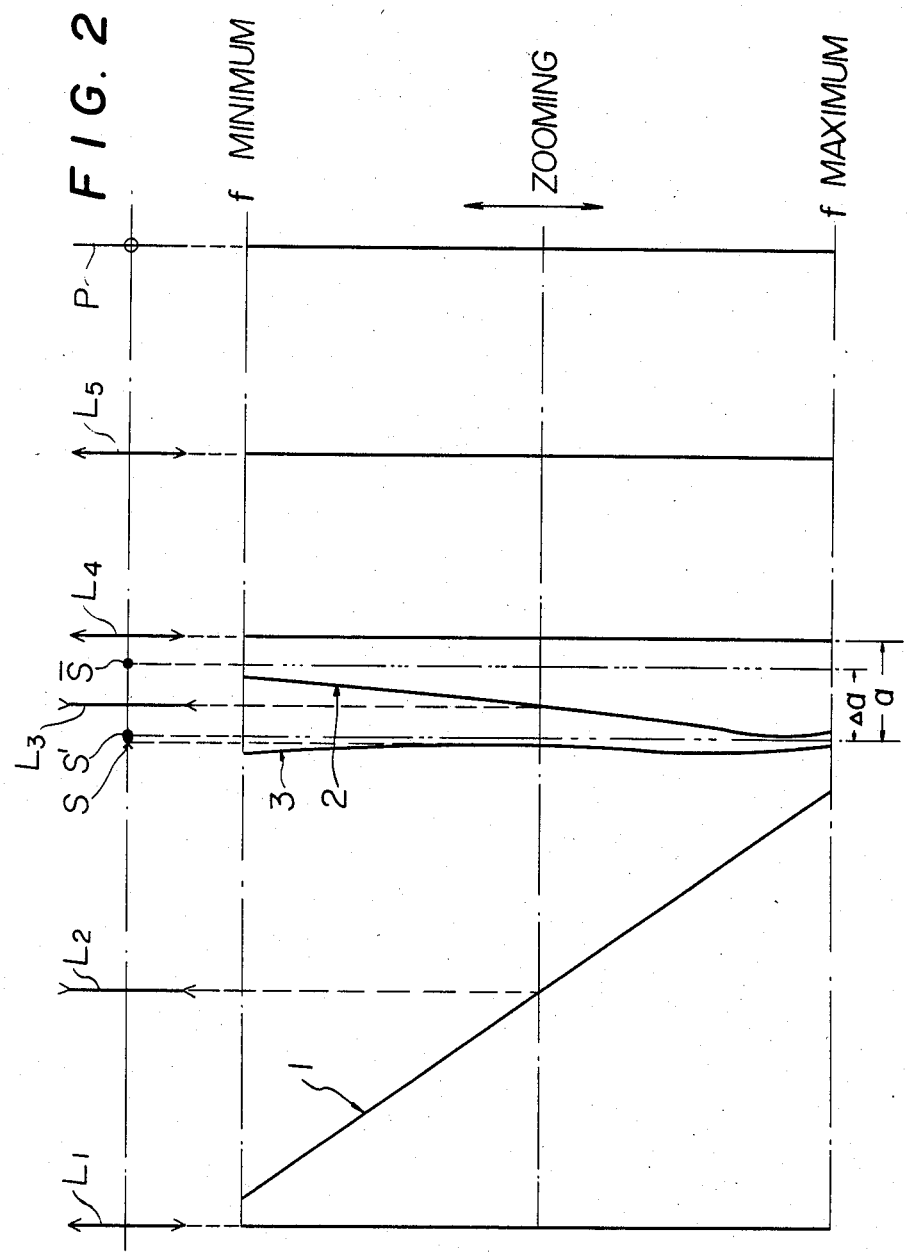
FIG. 2 diagrammatically and graphically illustrates the same effect for another embodiment of the zoom objective according to the invention.

In FIG. 2, the zoom objective shown in FIG. 1 is modified by replacement of the third and fourth components with components having negative and positive power respectively. Because of the negative power of the third component, the exit pupil S' is produced on the image side of the diaphragm S but the effect of the diaphragm shift on the exit pupil position is the same as in FIG. 1.

In the prior art, the front and rear movable components for zooming of the present invention are usually called "variator" and "compensator" respectively. However, it does not matter which is the front and which is the rear, since in some zoom objectives, the front and rear zoom components work respectively as variator and compensator in a part of the entire zoom range, but in the other part they work as compensator and variator respectively. The present invention is applicable to the both cases, therefore, the front and rear components movable for zooming are not defined as variator and compensator in the foregoing description.

According to preferred embodiments of the invention, the zoom objective can be constructed as represented by the numerical values in Table 1 and Table 2 for the focal length, $f$, of the complete objective, the focal lengths, $f_1$ to $f_5$, of lens components, $L_1$ to $L_5$, axial separations, $d_1$ to $d_5$ of the successive lens components, but $d_2$ and $d_3$ being separations from the diaphragm, the back focus, $bf$, and the zoom ratio, Z.

Table 1

| | | | |
|---|---|---|---|
| $f =$ | 15.745 ~ | 54.546 ~ | 203.845 |
| $f_1 = 179.0$ | | | |
| $d_1 =$ | -1.776 ~ | 69.785 ~ | 113.519 |
| $f_2 = -35.0$ | | | |
| $d_2 =$ | 131.417 ~ | 54.109 ~ | 11.5 |
| S | | | |
| $d_3 =$ | 14.714 ~ | 16.326 ~ | 6.0 |
| $f_3 = 38.0$ | | | |
| $d_4 =$ | 9.5 ~ | 17.187 ~ | 26.388 |
| $f_4 = -31.0$ | | | |
| $d_5 =$ | 45.0 ~ | 45.0 ~ | 45.0 |
| $f_5 = 52.0$ | | | |

$bf = 68.798$
$Z = 12.947$
$a = -33.513$
$\Delta a = -31.0$

Table 2

| | | | |
|---|---|---|---|
| $f =$ | 16.401 ~ | 37.950 ~ | 196.944 |
| $f_1 = 201.05$ | | | |
| $d_1 =$ | 9.05 ~ | 78.016 ~ | 147.751 |
| $f_2 = -3.20$ | | | |
| $d_2 =$ | 151.084 ~ | 85.497 ~ | 16.846 |
| S | | | |
| $d_3 =$ | 22.516 ~ | 10.647 ~ | 2.0 |
| $f_3 = -90.0$ | | | |
| $d_4 =$ | 14.5 ~ | 22.989 ~ | 30.554 |
| $f_4 = 53.9$ | | | |
| $d_5 =$ | 60.0 ~ | 60.0 ~ | 60.0 |
| $f_5 = 176.9$ | | | |

$bf = 70.087$
$Z = 12.008$
$a = -32.510$
$\Delta a = -23.5$

In practical embodiments of the invention adapted for certain types of zoom lens configuration or certain types of zooming mechanism, some compromise is necessary between the shift of the diaphragm and the movement of the zoom components in order to avoid mechanical interference or, collision between their mounts in a part of the entire zoom range. Nevertheless, the objective according to the invention can be designed to improve on the known lens in respect of minimizing the diameter of the front lens member with the selection of a modified variable air space between the diaphragm and the zoom component only in the interfering part of the zoom range, while high grade imagery is preserved throughout. In some cases, for example, the relationships specified in Table 2 are incompatible with the selection of practical lens parameters in a small part near the longest focal length position due to the interference between the diaphragm S and the third lens component $L_3$. In this case, the shift of the diaphragm S may be modified so as to follow the movement of the lens component $L_3$ in most closely spaced relationship to each other only in the interfering part of the zoom range. The modification will cause the image S' of the diaphragm to be displaced from the predetermined position, but the displacement is in a range of tolerance limits as far as the general-purpose zoom lens design is concerned, although such tolerance limits are unacceptable for zoom lenses adapted for use with color television cameras.

What is claimed is

1. An optical objective of the zoom type comprising, in combination, a focussing lens group; a lens group movable, for zooming, along the optical axis; a relay lens group; and a variable aperture diaphragm arranged within said movable lens group for shifting relative to a component of said movable lens group with adjustment of its aperture during such relative shifting to compensate the variation of the aperture ratio caused by shifting of said diaphragm; said component of said movable lens group, during such relative shifting, correcting the image of said diaphragm to maintain said image substantially constant in position relative to said relay lens group.

2. An optical objective of the zoom type according to claim 1, wherein said movable lens group consists of a front lens member of negative power and a rear lens member of positive power, and said diaphragm is located between said two members.

3. An optical objective of the zoom type according to claim 1, wherein said movable lens group consists of a front lens member of negative power and a rear lens group of negative power, and said diaphragm is located between said two lens members.

* * * * *